(12) United States Patent
El Ayach et al.

(10) Patent No.: US 10,326,546 B2
(45) Date of Patent: Jun. 18, 2019

(54) DIRECTIONAL SYNCHRONIZATION SIGNALS IN WIRELESS COMMUNICATIONS

(71) Applicant: QUALCOMM Incorporated, San Diego, CA (US)

(72) Inventors: Omar El Ayach, San Diego, CA (US); Sundar Subramanian, Bridgewater, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 14/624,723

(22) Filed: Feb. 18, 2015

(65) Prior Publication Data

US 2016/0087744 A1    Mar. 24, 2016

Related U.S. Application Data

(60) Provisional application No. 62/053,012, filed on Sep. 19, 2014.

(51) Int. Cl.
*H04L 1/18* (2006.01)
*H04J 11/00* (2006.01)
(Continued)

(52) U.S. Cl.
CPC ....... *H04J 11/0086* (2013.01); *H04J 11/0069* (2013.01); *H04J 11/0079* (2013.01);
(Continued)

(58) Field of Classification Search
CPC .............. H04J 11/0086; H04J 11/0069; H04J 11/0079; H04J 2011/0096; H04L 27/2666;
(Continued)

(56) References Cited

U.S. PATENT DOCUMENTS

2008/0130486 A1   6/2008   Lim et al.
2013/0089067 A1   4/2013   Ji et al.
(Continued)

FOREIGN PATENT DOCUMENTS

| EP | 2916600 A1 | 9/2015 |
|---|---|---|
| WO | WO-2013071506 A1 | 5/2013 |
| WO | WO-2014069967 A1 | 5/2014 |

OTHER PUBLICATIONS

3GPP, "3rd Generation Partnership Project; Technical Specification Group Radio Access Network; Evolved Universal Terrestrial Radio Access (E-UTRA); Physcial channels and modulation (Release 12)," 3GPP TS 36.211 v12.2.0 (Jun. 2014) Technical Specification, Jun. 2014, pp. 1-121, XP_50774046A, 3rd Generation Partnership Project.
(Continued)

*Primary Examiner* — Walter J Divito
(74) *Attorney, Agent, or Firm* — Holland & Hart LLP

(57) ABSTRACT

Methods, systems, and devices are described for directional synchronization signal signals in a millimeter wave communication system. A user equipment (UE) may receive a narrowband signal component of a synchronization signal for the millimeter wave communications. The narrowband signal component may include correlation information. The UE may use the correlation information to identify a wideband signal component of the synchronization signal for the millimeter wave communications. The UE may search frequencies associated with a first frequency location determined from the correlation information to identify and detect the wideband signal component of the synchronization signal.

30 Claims, 10 Drawing Sheets

(51) Int. Cl.
*H04L 27/26* (2006.01)
*H04W 56/00* (2009.01)

(52) U.S. Cl.
CPC ...... *H04L 27/2655* (2013.01); *H04L 27/2692* (2013.01); *H04W 56/001* (2013.01); *H04J 2011/0096* (2013.01); *H04L 1/1812* (2013.01)

(58) Field of Classification Search
CPC ........... H04L 27/2655; H04L 27/2692; H04W 56/001
See application file for complete search history.

(56) References Cited

U.S. PATENT DOCUMENTS

| | | | |
|---|---|---|---|
| 2013/0194997 A1 | 8/2013 | Zhu | |
| 2013/0235851 A1 | 9/2013 | Abu-Surra et al. | |
| 2014/0029568 A1 | 1/2014 | Wang et al. | |
| 2014/0152437 A1 | 6/2014 | Tian et al. | |
| 2014/0204928 A1* | 7/2014 | Sorin | H04W 56/001 370/338 |
| 2014/0211752 A1* | 7/2014 | Berggren | H04L 5/003 370/330 |
| 2015/0043520 A1* | 2/2015 | Sun | H04L 5/001 370/330 |

OTHER PUBLICATIONS

ISA/EPO, Partial International Search Report of the International Searching Authority, Int'l App. No. PCT/US2015/046559, Nov. 9, 2015, European Patent Office, Rijswijk, NL, 7 pgs.
ISA/EPO, International Search Report and Written Opinion of the International Searching Authority, Int'l. App. No. PCT/US2015/046559, Feb. 3, 2016, European Patent Office, Rijswijk, NL, 17 pgs.
Tomatis et al., "7: Synchronization and Cell Search," LTE—the UMTS Long Term Evolution: From Theory to Practice (ed. Sesia et al.), 2009, pp. 141-157, ISBN 978-0-470-69716-0, XP_55064038A, John Wiley & Sons, Ltd.
Rhode, Rohde & Schwarz et al.,"TDMA Methods, p. 1 Access Methods in GSM," XP055302956, 26 pgs., Retrieved from the Internet: URL:http://firead.pudn.com/downloads161/ebook/733562/GSM/GSM_chap5.pdf.
ISA/EPO, Partial International Search Report of the International Searching Authority, Int'l. App. No. PCT/US2015/046559, Sep. 22, 2016, European Patent Office, Munich, DE, 5 pgs.
Taiwan Search Report—TW104127355—TIPO—dated Dec. 6, 2018.

* cited by examiner

DIRECTIONAL SYNCHRONIZATION SIGNALS IN WIRELESS COMMUNICATIONS

CROSS REFERENCES

The present Application for Patent claims priority to U.S. Provisional Patent Application No. 62/053,012 by El Ayach et al., entitled "Directional Synchronization Signals in Wireless Communications," filed Sep. 19, 2014, and assigned to the assignee hereof.

BACKGROUND

Field of the Disclosure

The present disclosure relates to wireless communication systems, and more particularly to directional synchronization signals in wireless communications.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). UEs may locate a base station by detecting synchronization signal(s), from which the UEs acquire the base station identification code (cell ID), system timing information, frame alignment information, etc. In systems where the receiver is highly signal strength and noise limited (e.g., millimeter wave systems), beamformed synchronization signals may be swept across the cell coverage area to provide coverage enhancement to improve detection.

Conventional cellular synchronization and discovery techniques generally employ primary and secondary synchronization signals broadcast at a fixed frame location within the coverage area of a base station or cell. The UE scans for the primary synchronization signal (PSS) and, if detected, finds the secondary synchronization signal (SSS) in the same subframe as the primary synchronization signal. The PSS/SSS generally include physical layer and cell layer identity information, respectively, used by the UE to determine the base station identity. From the identity, the UE is able to determine the location of reference signals where the UE is able to perform channel estimation, etc. In these signaling techniques, however, the location of the SSS is fixed in the same subframe as the PSS and, therefore, the UE must detect both signals to determine the base station identity for further synchronization.

SUMMARY

The described features generally relate to one or more improved systems, methods, and/or apparatuses for directional synchronization signals in wireless communications. Certain aspects of the present description employ a dual-signal synchronization scheme that includes a narrowband signal and a wideband signal for millimeter wave communications. The narrowband signal (e.g., a beacon) may convey portions of the cell ID and at least some timing information. The wideband signal may convey any remaining portion of the cell ID and additional timing information. A UE detects the higher power narrowband signal and then searches for the accompanying wideband signal. In some examples, the UE may determine enough cell ID information (e.g., first three bits of the cell ID) from the narrowband signal to determine the location (e.g., time/frequency) of the accompanying wideband signal.

Therefore, in some examples, the narrowband signal of a synchronization signal may be received. The synchronization signal may be for a millimeter wave communication system. The narrowband signal may include or otherwise convey location information associated with the wideband signal of the synchronization signal. The location information may be a frequency location, a time location, or combinations thereof. In some examples, the narrowband signal portion or component of the synchronization signal may also include timing information associated with the wireless communication system and/or all or some identification information associated with the source of the synchronization signal. The location information may be used to identify the wideband signal of the synchronization signal. For example, the location information may be used to determine the frequency and/or the time the wideband signal will be transmitted and, therefore, used to receive the wideband signal. Other waveform parameters associated with the wideband signal may also be included or conveyed in the narrowband signal. The wideband signal may include or otherwise convey, in some examples, components of the cell ID and/or timing information associated with the millimeter wave communication system. In some examples, a selection of other parameters associated with the wideband signal may be used to implicitly convey the additional timing information.

A method of wireless communication at a wireless device is described. The method may include receiving a narrowband signal component of a synchronization signal for millimeter wave communications, the narrowband signal component comprising correlation information, and using the correlation information to identify a wideband signal component of the synchronization signal for the millimeter wave communications.

An apparatus for wireless communication at a wireless device is described. The apparatus may include means for receiving a narrowband signal component of a synchronization signal for millimeter wave communications, the narrowband signal component comprising correlation information, and means for using the correlation information to identify a wideband signal component of the synchronization signal for the millimeter wave communications.

A further apparatus for wireless communication at a wireless device is described. The apparatus may include a processor, memory in electronic communication with the processor, and instructions stored in the memory, wherein the instructions are executable by the processor to receive a narrowband signal component of a synchronization signal for millimeter wave communications, the narrowband signal component comprising correlation information, and use the correlation information to identify a wideband signal component of the synchronization signal for the millimeter wave communications.

A non-transitory computer-readable medium storing computer executable code for wireless communication at a wireless device is described. The code may be executable by a processor to receive a narrowband signal component of a synchronization signal for millimeter wave communications, the narrowband signal component comprising correlation information, and use the correlation information to identify a wideband signal component of the synchronization signal for the millimeter wave communications.

In some examples of the method, apparatuses, or non-transitory computer-readable medium described above, the correlation information may include at least one of frequency location information, time location information, and encoded information relating to the wideband signal component of the synchronization signal for the millimeter wave communications. Additionally or alternatively, in some examples the narrowband signal component of the synchronization signal and the wideband signal component of the synchronization signal may be received at a similar time.

Some examples of the method, apparatuses, or non-transitory computer-readable medium described above may further include identifying a source of the synchronization signal based at least in part on one or more of a frequency of the narrowband signal component and information associated with the source encoded in the narrowband signal component. Additionally or alternatively, some examples may include identifying, based at least in part on the identified source, one or more waveform parameters associated with the wideband signal component of the synchronization signal.

In some examples of the method, apparatuses, or non-transitory computer-readable medium described above, the one or more waveform parameters may include information associated with at least one of a pseudorandom noise sequence, a maximum length sequence, and at least one root of a Zadoff-Chu sequence. Additionally or alternatively, in some examples the at least one root of the Zadoff-Chu sequence is associated with a frame boundary.

In some examples of the method, apparatuses, or non-transitory computer-readable medium described above, receiving the wideband signal component includes searching a frequency associated with the one or more identified one or more waveform parameters. Additionally or alternatively, some examples may include identifying a timing reference based at least in part on the identified one or more waveform parameters associated with the wideband signal component.

Some examples of the method, apparatuses, or non-transitory computer-readable medium described above may further include identifying a hopping pattern associated with the narrowband signal component of the synchronization signal. Additionally or alternatively, in some examples a periodicity of the hopping pattern is associated with a frame and the hopping pattern is reset at a boundary of the frame.

Some examples of the method, apparatuses, or non-transitory computer-readable medium described above may further include identifying a timing reference based at least in part on the hopping pattern. Additionally or alternatively, in some examples a first timing reference conveyed in the narrowband signal component is associated with a system timing and a second timing reference conveyed in the wideband signal component is associated with a frame timing.

In some examples of the method, apparatuses, or non-transitory computer-readable medium described above, the narrowband signal component includes a beacon signal and the wideband signal component comprises a wideband signal. Additionally or alternatively, in some examples the wideband signal includes information associated with at least one of a pseudorandom noise sequence, a maximum length sequence, and at least one root of a Zadoff-Chu sequence.

In some examples of the method, apparatuses, or non-transitory computer-readable medium described above, the narrowband signal component and the wideband signal component of the synchronization signal are directionally transmitted via one or more beamformed signals.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
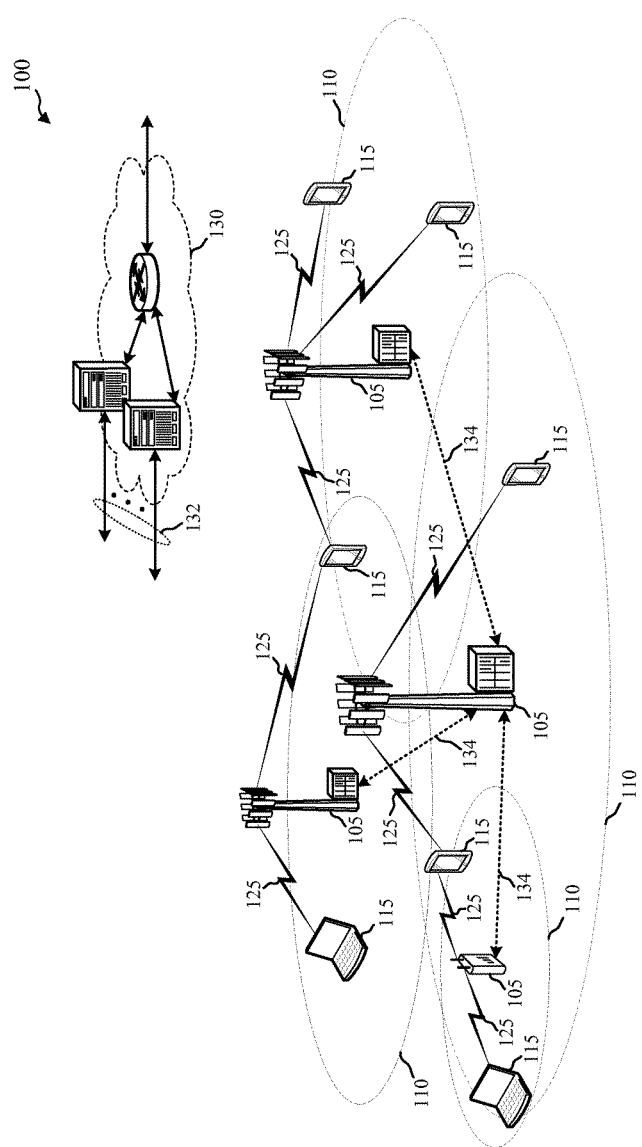
FIG. 1 shows a block diagram of a wireless communication system, in accordance with various aspects of the present disclosure.

According to aspects of the present description, in high frequency systems (e.g., millimeter wave communication systems), a base station may employ a dual-component synchronization signal scheme where two signals are transmitted. A UE may receive the first signal component of a synchronization signal and then begin to search for the second component of the synchronization signal. The combination of the first and second components of the synchronization signal may generally convey timing information, cell ID, and/or various other parameters associated with the wireless communication system. In some examples, the UE may receive the narrowband signal component and determine various waveform parameters associated with the wideband signal, e.g., location, etc. The UE may search the determined location (e.g., frequencies and/or time) to find the second wideband component of the synchronization signal. A base station that transmits the synchronization signal may pair the wideband signal component with the narrowband signal component based on the identity of the base station, for example. Accordingly, the UE may determine some or all of the cell ID information from the narrowband signal and, based on the cell ID, know where to locate the associated wideband signal component.

According to additional aspects of the present description, the location of a narrowband signal may be used to signal or otherwise convey location information for the wideband signal of the synchronization signal. Similarly, the narrowband signal may include other information, such as information regarding the properties of the wideband signal. A UE may receive the narrowband signal portion of the synchronization signal of a millimeter wave communication system and, based on information included or conveyed in the narrowband signal, identify the wideband signal portion. The information may include location information such as a frequency location of the wideband signal, a time location of the wideband signal, additional parameters of the wideband signal, or combinations thereof. Accordingly, the UE may be able to monitor for and receive the wideband signal portion of the synchronization signal without searching every location. In some examples, the narrowband signal may include or convey identification information associated with the source (e.g., base station) transmitting the synchronization signal. The UE may use the source ID information (e.g., as a function, via a look-up table, etc.) to determine the location of the wideband signal.

According to additional aspects of the present disclosure, the wideband signal may be used to signal or convey additional parameters. For example, certain timing information may be embedded in the wideband signal based on a hopping pattern of the narrowband signal, based on one or more parameters conveyed by the wideband signal, or combinations thereof. In some examples, the wideband signal may include various waveform parameters. In some examples, the waveform parameters may indicate a root of a Zadoff-Chu (ZC) sequence, or ZC root groups associated with the wideband signal. In other examples where non-ZC sequences may be used (e.g., a pseudorandom noise (PN) sequence, a maximum length sequence (m-sequence), etc.) the waveform parameters may include other parametrized quantities associated with the sequences, e.g., a scrambling code parametrized by a random seed.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through a first set of backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over a second set of backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context. In some examples, the wireless communications system 100 may be, or include a millimeter wave communication network.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, and the like. A UE 115 may also be able to communicate with other UEs either within or outside the same coverage area of a base station via D2D communications.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support directional synchronization signal for millimeter wave detection and synchronization. For example, a millimeter wave base station 105 may transmit a directional synchronization signal in a sweeping pattern to UEs 115 within its coverage area 110. The base station 105 may configure a narrowband signal of the synchronization signal to convey correlation information, such as location information (e.g., based on cell ID information included or conveyed in the narrowband signal), for a wideband signal of the synchronization signal. Hereinafter, information regarding the properties of the wideband signal may be referred to as correlation information. The base station 105 may link the wideband signal to the location of the narrowband signal. In some examples, the identification information of the base station 105 may be included or conveyed in the narrowband signal. The identification information may convey the location information, e.g., the UE 115 may perform a function based on the base station 105 identification number and/or access a lookup table. The base station 105 may send the wideband signal component of the synchronization signal according to the correlation information in the narrowband signal.

A UE 115 may receive the narrowband signal of the synchronization signal for the millimeter wave communication network and determine the correlation information associated with the wideband signal from the narrowband signal. For example, the UE 115 may identify the base station 105 sending the narrowband signal, may determine the base station 105 identity based on the frequency of the narrowband signal, etc., to determine the correlation information. The UE 115 may use the correlation information to identify and receive the wideband signal. In some examples, the UE 115 may determine timing information based on the narrowband signal and/or the wideband signal components of the synchronization signal, e.g., system timing, frame boundary/length timing, etc.

Figure 2:
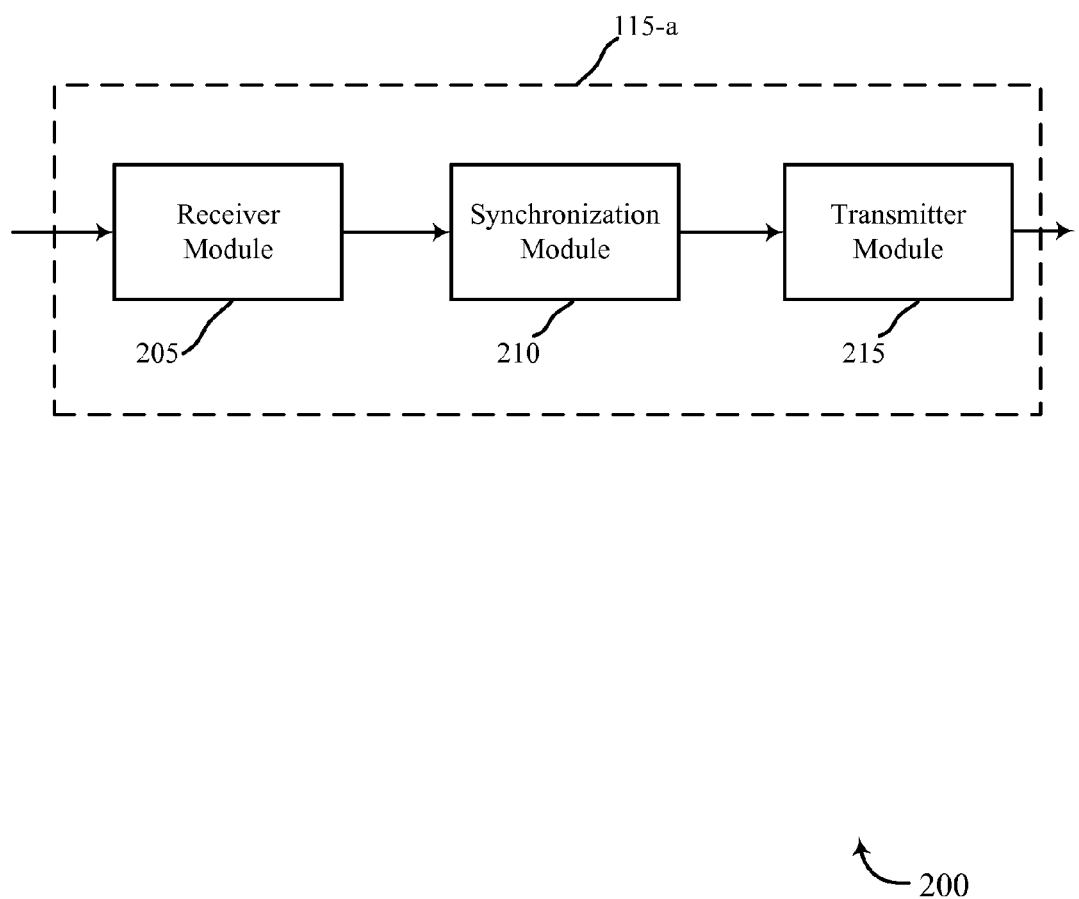
FIG. 2 shows a block diagram of a device configured for use in wireless communication, in accordance with various aspects of the present disclosure.

FIG. 2 shows a block diagram 200 of a device 115-a for use in wireless communication, in accordance with various aspects of the present disclosure. The device 115-a may be an example of one or more aspects of a UE 115 described with reference to FIG. 1. The device 115-a may include a receiver module 205, a synchronization module 210, and/or a transmitter module 215. The device 115-a may also be or include a processor (not shown). Each of these modules may be in communication with each other.

The components of the device 115-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 205 may receive information such as packets, user data, and/or control information associated with various information channels (e.g., control channels, data channels, etc.). The receiver module 205 may receive messages from a millimeter wave base station 105 including information associated with synchronization signaling. Information may be passed on to the synchronization module 210, and to other components of the device 115-*a*.

The synchronization module 210 may manage synchronization functions for the device 115-*a*. The synchronization module 210 may receive, via the receiver module 205, a narrowband signal of a synchronization signal for a millimeter wave communication system. The narrowband signal may include or convey correlation information associated with a wideband signal of the synchronization signal. The synchronization module 210 may use the correlation information to identify and receive, via the receiver module 205, the wideband signal component of the synchronization signal. In some examples, the synchronization module 210 may, based on the narrowband signal, identify the source of the narrowband signal. The synchronization module 210 may, for example, determine the source identity based on the frequency of the narrowband signal and/or information encoded in the narrowband signal. In some examples, the synchronization module 210 may identify and receive the wideband signal component based on knowing the source identity.

The transmitter module 215 may transmit the one or more signals received from other components of the device 115-*a*. The transmitter module 215 may transmit information such as packets, user data, and/or control information to a serving cell. The transmitter module 215 may send messages to a millimeter wave base station 105 in conjunction with various synchronization signaling operations, e.g., random access procedures. In some examples, the transmitter module 215 may be collocated with the receiver module 205 in a transceiver module.

Figure 3:
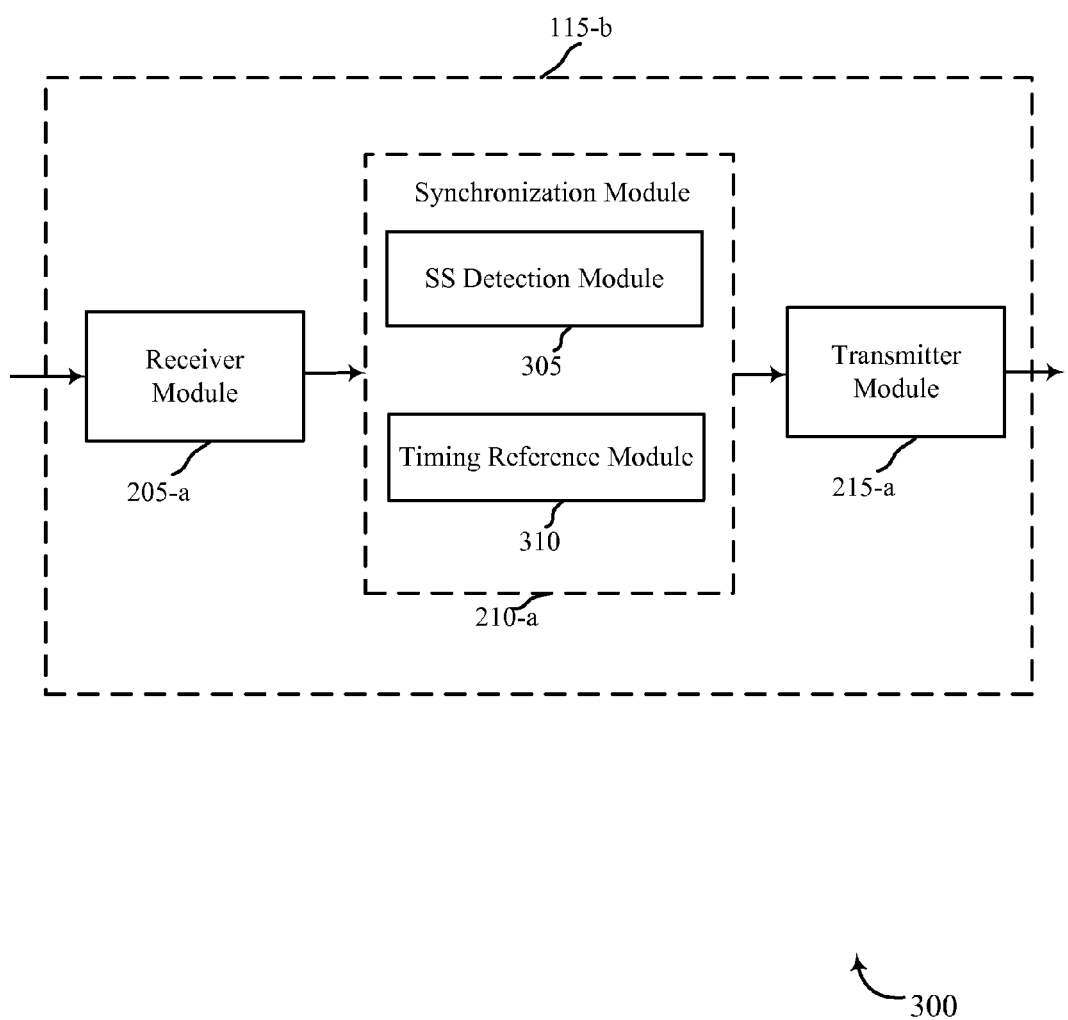
FIG. 3 shows a block diagram of a device configured for use in wireless communication, in accordance with various aspects of the present disclosure.

FIG. 3 shows a block diagram 300 of a device 115-*b* for use in wireless communication, in accordance with various examples. The device 115-*b* may be an example of one or more aspects of a UE 115 described with reference to FIG. 1. It may also be an example of a device 115-*a* described with reference to FIG. 2. The device 115-*b* may include a receiver module 205-*a*, a synchronization module 210-*a*, and/or a transmitter module 215-*a*, which may be examples of the corresponding modules of device 115-*a*. The device 115-*b* may also include a processor (not shown). Each of these components may be in communication with each other. The synchronization module 210-*a* may include a synchronization signal detection module 305 and a timing reference module 310. The receiver module 205-*a* and the transmitter module 215-*a* may perform the functions of the receiver module 205 and the transmitter module 215, of FIG. 2, respectively.

The components of the device 115-*b* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The synchronization signal detection module 305 may manage aspects of synchronization signal detection and management for the device 115-*b*. The synchronization signal detection module 305 may, in cooperation with the receiver module 205-*a* and/or the transmitter module 215-*a*, receive a narrowband signal of a synchronization signal for millimeter wave communications. The synchronization signal detection module 305 may determine, based on information included or conveyed in the narrowband signal, correlation information for the wideband signal of the synchronization signal. The correlation information may include location information such as a frequency location of the wideband signal or a time location of the wideband signal, or encoded information relating to the wideband signal, or any combination thereof. In some cases, the encoded information may be used to determine location information of the wideband signal. The synchronization signal detection module 305 may identify and receive the wideband signal based on the correlation information. In some examples, the narrowband signal and/or the wideband signal may include or convey identification information associated with the sending base station 105 and timing information associated with the millimeter wave communication system. In some cases, the narrowband signal and the wideband signal may be received simultaneously. In some examples, the narrowband signal and the wideband signal may be received at different times.

The timing reference module 310 may manage aspects of synchronization reference timing for the device 115-*b*. For example, the timing reference module 310 may, in cooperation with the synchronization signal detection module 305, determine one or more timing references for the device 115-*b*. In some examples, the wideband signal may include or convey system timing information, e.g., fine system timing, for the millimeter wave communication system. The narrowband signal may include or convey frame timing information, e.g., frame boundaries, frame length, etc., for the millimeter wave communication system. In some examples, the narrowband signal and the wideband signal may include or convey the frame timing information. The timing reference module 310 may communicate with the synchronization signal detection module 305 to determine the timing information included or conveyed in the narrowband and wideband signal components of the synchronization signal.

In some examples, the timing reference module 310 may determine the reference timing information based on a location and/or a hopping pattern for the wideband signal and/or the narrowband signal. For example, the narrowband signal may be sent according to a predetermined hopping pattern such that the hopping pattern is associated with a frame and the hopping pattern is reset at the frame boundary. The wideband signal may also be sent according to a predetermined hopping pattern to convey additional information.

Figure 4:
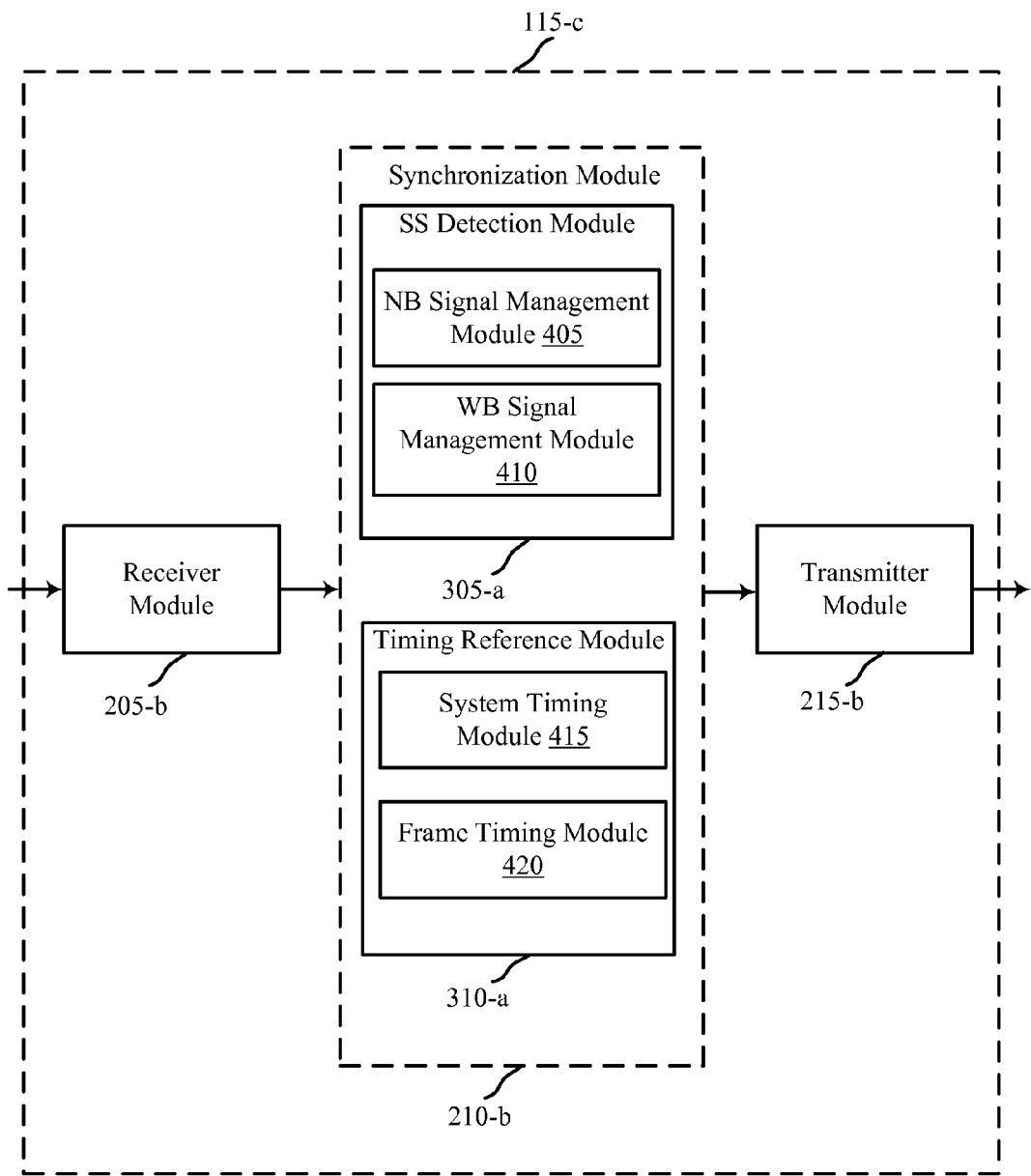
FIG. 4 shows a block diagram of a device configured for use in wireless communication, in accordance with various aspects of the present disclosure.

FIG. 4 shows a block diagram 400 of a device 115-c for use in wireless communication, in accordance with various examples. The device 115-c may be an example of one or more aspects of a UE 115 described with reference to FIG. 1. It may also be an example of a device 115-a and/or 115-b described with reference to FIGS. 2 and 3. The device 115-c may include a receiver module 205-b, a synchronization module 210-b, and/or a transmitter module 215-b, which may be examples of the corresponding modules of devices 115-a and/or 115-b. The device 115-c may also include a processor (not shown). Each of these components may be in communication with each other. The synchronization module 210-b may include a synchronization signal detection module 305-a, and a timing reference module 310-a. The receiver module 205-b and the transmitter module 215-b may perform the functions of the receiver module 205 and the transmitter module 215, of FIG. 2, respectively.

The components of the device 115-c may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The synchronization signal detection module 305-a may include a narrowband signal management module 405 and a wideband signal management module 410 and may manage aspects of synchronization signal identification and management for the device 115-c. The narrowband signal management module 405 may, via the receiver module 205-b, receive a narrowband signal of a synchronization signal for millimeter wave communications. The narrowband signal may include or convey correlation information for a wideband signal of the synchronization signal. The narrowband signal management module 405 may use the correlation information to determine and output information indicative of the location information, e.g., a frequency of the wideband signal and/or a timing of the wideband signal. In some examples, the narrowband signal may include identification information associated with the source base station 105 transmitting the narrowband signal. The location of the narrowband signal, or correlation information of the narrowband signal, may convey the identification information, for example. In another example, the correlation information of the narrowband signal may be encoded with at least a portion of the identification information. In some cases, the narrowband signal and the wideband signal may be received simultaneously, or at a similar time. The wideband signal may be stored, such as in a buffer or memory, while the narrowband signal is used to determine information, such as location information, related to the wideband signal.

The wideband signal management module 410 may receive the identification information and use it to detect and receive the wideband signal of the synchronization signal. The wideband signal management module 410 may search frequencies associated with the location information. In some examples, the wideband signal management module 410 may determine, based on the wideband signal, additional parameters. The narrowband signal may be transmitted via a predetermined hopping pattern where the hopping pattern may convey additional information, e.g., frame timing. The hopping pattern may indicate the frame and be reset at the frame boundary, e.g., to convey the frame timing information. In some examples, the additional waveform parameters of the wideband signal may include information relating to a sequence, such as a ZC sequence, PN sequence, or an m-sequence, or information indicative of root groups associated with the wideband signal. The root groups may be ZC root groups, for example. The wideband signal management module 410 may determine and output information indicative of the root group information. The additional waveform parameters of the wideband signal may include information etc.

In some examples, the wideband signal may also include or convey additional identification information associated with the source base station. As one example, the narrowband signal may include a first portion (e.g., first two or three bits of the identification information) and the wideband signal may include the remaining portions of the identification information (e.g., the remaining bits). The wideband signal management module 410, in cooperation with the narrowband signal management module 405, determine and output information indicative of the base station identification information.

The timing reference module 310-a may include a system timing module 415 and a frame timing module 420 and may manage aspects of timing operations for the device 115-c. The device 115-c may generally use system timing information as well as frame timing information to communicate via the millimeter wave communication system. The system timing may generally refer to the general reference timing used by the base station(s) 105 of the millimeter wave communication system and its communicating UEs 115. The frame timing may generally refer to the timing of frames, blocks, or other logical units for control and/or data communications.

The system timing module 415 may, in cooperation with the wideband signal management module 410, determine the system timing information based on the wideband signal, for example. For example, the system timing module 415 may receive the wideband signal and determine the system timing information or receive information from the wideband signal management module 410 indicative of the wideband signal. In some examples, the narrowband signal may include or convey aspects of the system timing information. Accordingly, the system timing module 415 may cooperate with the narrowband signal management module 405 to determine the system timing information conveyed in the narrowband signal. The system timing module 415 may output information indicative of the system timing to other components of the device 115-c for synchronization operations.

The frame timing module 420 may, in cooperation with the narrowband signal management module 405, determine the frame timing information based on the narrowband signal. For example, the frame timing module 420 may receive the narrowband signal and determine the frame timing information or receive information from the narrowband signal management module 405 indicative of the narrowband signal. In some examples, the wideband signal may also include or convey frame timing information. The frame timing module 420 may output information indicative of the frame timing to other components of the device 115-c for synchronization operations.

Figure 5:
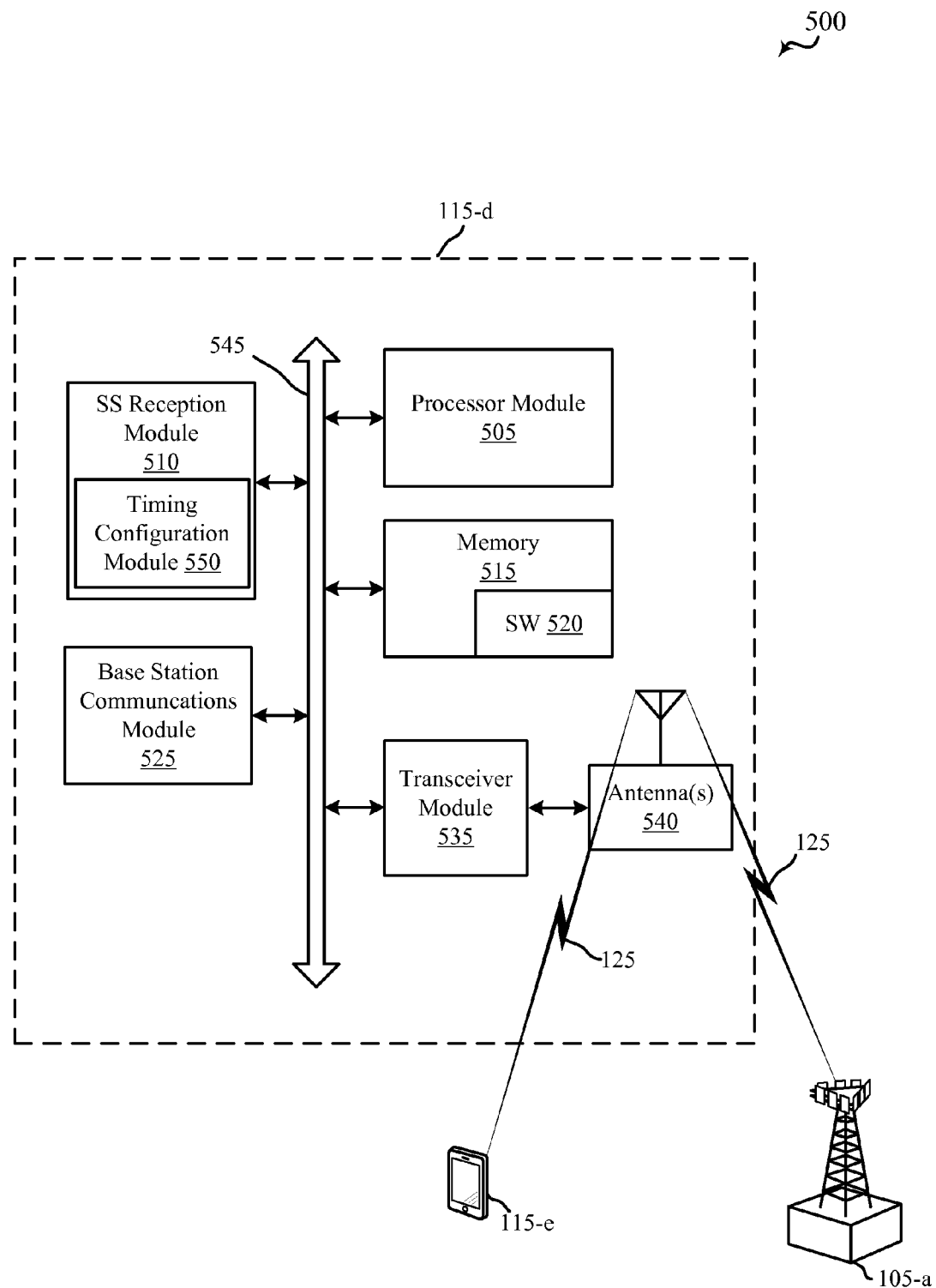
FIG. 5 shows a block diagram of a wireless communication system, in accordance with various aspects of the present disclosure.

FIG. 5 shows a system 500 for use in wireless communication, in accordance with various examples. System 500 may include a UE 115-d, which may be an example of the UEs 115 of FIG. 1. UE 115-d may also be an example of one or more aspects of devices 115 of FIGS. 2, 3, and/or 4.

The UE 115-d may generally include components for bi-directional voice and data communications including components for transmitting communications and components for receiving communications. The UE 115-d may include antenna(s) 540, a transceiver module 535, a processor module 505, and memory 515 (including software (SW) 520), which each may communicate, directly or indirectly, with each other (e.g., via one or more buses 545). The transceiver module 535 may communicate bi-directionally, via the antenna(s) 540 and/or one or more wired or wireless links, with one or more networks, as described above. For example, the transceiver module 535 may communicate bi-directionally with base stations 105, with other UEs 115, and/or with devices 115 with reference to FIG. 1, 2, 3, or 4. The transceiver module 535 may include a modem to modulate the packets and provide the modulated packets to the antenna(s) 540 for transmission, and to demodulate packets received from the antenna(s) 540. While the UE 115-d may include a single antenna 540, the UE 115-d may have multiple antennas 540 capable of concurrently transmitting and/or receiving multiple wireless transmissions via carrier aggregation techniques, for example. The transceiver module 535 may be capable of concurrently communicating with one or more base stations 105 via multiple component carriers.

The UE 115-d may include a synchronization signal reception module 510, which may perform the functions described above for the synchronization module 210 of devices 115 of FIGS. 2, 3, and/or 4. The UE 115-d may also include a timing configuration module 550. The timing configuration module 550 may determine, monitor, control, and/or otherwise manage aspects of synchronization timing operations for the UE 115-d. The timing configuration module 550 may, based on timing information included or conveyed in the narrowband signal and/or the wideband signal, determine system timing parameters and frame timing parameters for the device 115-d. The reference timing information may provide for communication between the device 115-d and a base station 105 of a millimeter wave communication system. Accordingly, the device 115-d may detect and receive millimeter wave communications with improved synchronization operations.

The memory 515 may include random access memory (RAM) and read-only memory (ROM). The memory 515 may store computer-readable, computer-executable software/firmware code 520 containing instructions that, when executed, cause the processor module 505 to perform various functions described herein (e.g., perform synchronization operations, synchronize reference timing parameters, etc.). Alternatively, the computer-readable, computer-executable software/firmware code 520 may not be directly executable by the processor module 505 but cause a computer (e.g., when compiled and executed) to perform functions described herein. The processor module 505 may include an intelligent hardware device, e.g., a central processing unit (CPU), a microcontroller, an application-specific integrated circuit (ASIC), etc.

Figure 6:
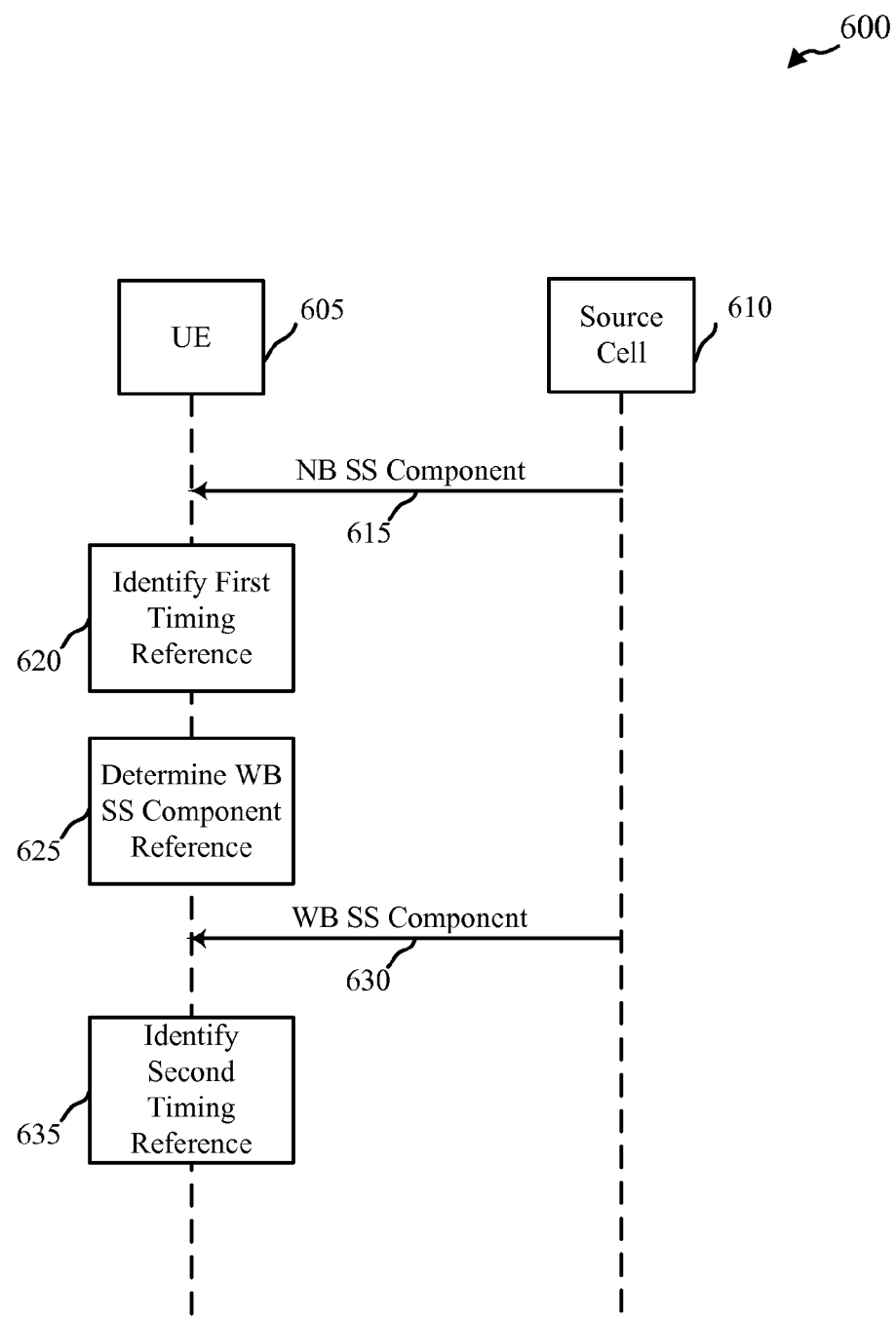
FIG. 6 shows a swim diagram illustrating aspects of directional synchronization signals in wireless communication, in accordance with various aspects of the present disclosure.

FIG. 6 is a swim diagram 600 illustrating aspects of synchronization operations, in accordance with various aspects of the present disclosure. The diagram 600 may illustrate aspects of the system 100 and/or 500 described with reference to FIG. 1 or 5, respectively. The diagram 600 includes a UE 605 and a source cell 610. The UE 605 may be an example of one or more of the UEs 115 and/or devices 115 described above with respect to FIGS. 1, 2, 3, 4, and/or 5. The source cell 610 may be an example of one or more of the base stations 105 described above with respect to FIG. 1. Generally, the diagram 600 illustrates aspects of implementing directional synchronization signaling in millimeter wave communication systems. In some examples, a system device, such as one of the UEs 115 and/or base stations 105 may execute one or more sets of codes to control the functional elements of the device to perform some or all of the functions described below.

At block 615, the source cell 610 sends a narrowband signal of a synchronization signal for millimeter wave wireless communications. The narrowband signal may include or otherwise convey correlation information associated with a wideband signal for the synchronization signal. For example, the narrowband signal may include or convey frequency location information for the wideband signal, time location information for the wideband signal, or combinations thereof. The narrowband signal may, for example, include or convey identification information associated with the source cell 610. The narrowband signal may also include or convey timing reference information. At block 620, the UE 605 may identify the timing reference information. In some aspects, the UE 605 may identify system timing information based on the narrowband signal, frame timing information based on the narrowband signal, or combinations thereof.

At block 625, the UE 605 may determine the location information for the wideband signal. In some cases, the correlation information is used to determine the location information for the wideband signal. For example, the UE 605 may use the identification information of the source cell 610 to determine the location information for the wideband signal. The location information may be a frequency location for the wideband signal, for example. At 630, the source cell 610 may send the wideband signal to the UE 605, which knows which location to monitor to receive the wideband signal based on the location information. Accordingly, the UE 605 may receive the wideband signal without having to monitor, receive, and/or process every location where the wideband signal could be sent. The wideband signal may include or convey additional timing reference information, e.g., system timing information, frame timing information, or combinations thereof. In some examples, a hopping pattern of the narrowband signal may convey additional timing information. At block 635, the UE 605 may identify the additional timing information based on the wideband signal. Accordingly, the UE 605 may detect and receive the narrowband and wideband signals of the synchronization signal to synchronize with the source cell 610.

Figure 7:
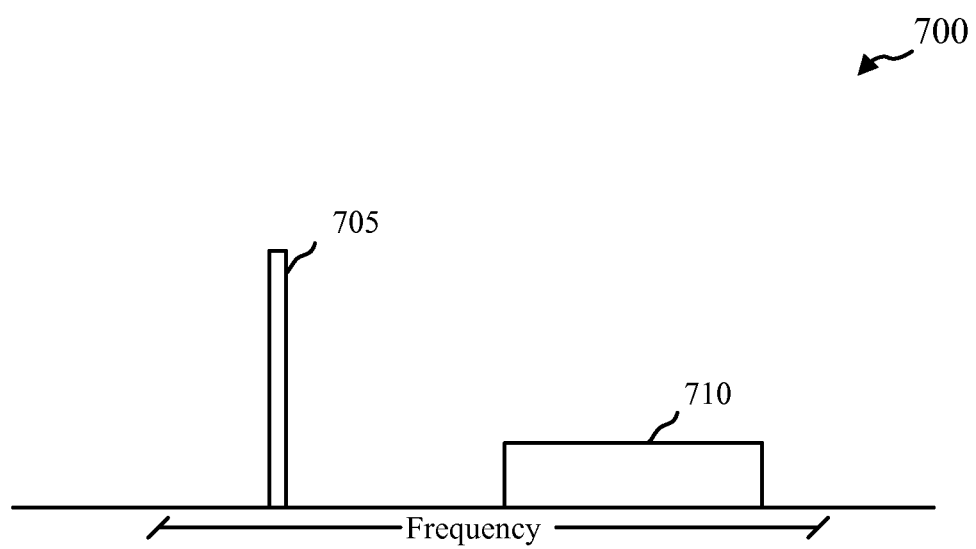
FIG. 7 shows a diagram of an example dual-component synchronization signal, in accordance with various aspects of the present disclosure.

FIG. 7 is a diagram 700 illustrating aspects of an example synchronization signal, in accordance with various aspects of the present disclosure. The diagram 700 may illustrate aspects of the system 100 and/or 500 described with reference to FIG. 1 or 5, respectively. One or more of the UEs 115 and/or devices 115 described above with respect to FIGS. 1, 2, 3, 4, and/or 5 may implement aspects of the diagram 700. In some examples, a system device, such as one of the UEs 115 and/or base stations 105 may execute one or more sets of codes to control the functional elements of the device to perform some or all of the functions illustrated with respect to diagram 700.

The diagram 700 may include a narrowband signal 705 and a wideband signal 710 of a synchronization signal for millimeter wave communications. The narrowband signal 705 may have an amplitude greater than the wideband signal. The narrowband signal 705 may be transmitted at a location (e.g., a frequency) selected to convey location information associated with the wideband signal 710. For example, the location of the narrowband signal 705 may be associated with an identity of the source cell transmitting the narrowband signal 705. A UE receiving the narrowband signal 705 may use the location of the narrowband signal to determine the location of the wideband signal 710 based on the identification of the source cell. For example, the source cell may be associated with wideband signals at predetermined locations (e.g., frequency/time). In some cases, parameters or information associated with the narrowband signal 705 may be used to convey the location of the wideband signal 710. For example, a timing, a frequency, an amplitude, or other parameters of the narrowband signal 705, or information encoded in the narrowband signal 705, may be used to convey the location of the wideband signal 710. The narrowband signal 705 may also include or convey timing reference information for the millimeter wave communication system. For example, the narrowband signal 705 may include or convey system timing information, frame timing information, or combinations thereof. In some examples, the narrowband signal 705 may sent according to a predetermined hopping pattern where the hopping pattern conveys timing information.

The wideband signal 710 may have a wider bandwidth with respect to the narrowband signal 705. The wideband signal 710 may span one or more frequencies and include additional identification information for the source cell as well as additional timing reference information. In some examples, the wideband signal 710 may hop across frequencies such that the hopping pattern conveys the timing information. The additional timing information may be system timing information, frame timing information, or combinations thereof. In some examples, the narrowband signal 705 may convey the frame timing information and the wideband signal 710 may convey the system timing information. In some examples, the wideband signal 710 may also include or convey other waveform parameters, such as information relating to a ZC sequence, a PN sequence, an m-sequence, etc. For example, the wideband signal 710 may include or convey information identifying one or more root groups for the wideband signal 710 (e.g., ZC root groups). As discussed, the location information for the wideband signal 710 may be included or conveyed in the narrowband signal 705.

Figure 8:
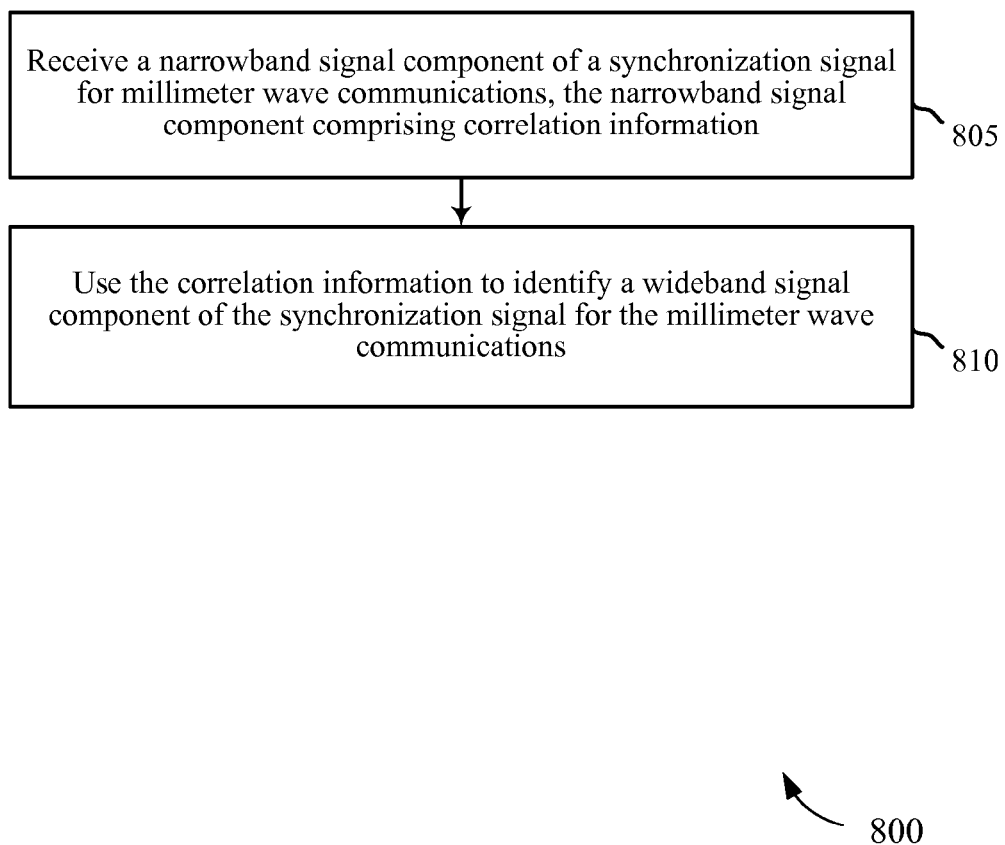
FIG. 8 is a flow chart illustrating an example of a method for wireless communication, in accordance with various aspects of the present disclosure.

FIG. 8 is a flow chart illustrating an example of a method 800 for wireless communication, in accordance with various aspects of the present disclosure. For clarity, the method 800 is described below with reference to aspects of one or more of the UEs described with reference to FIG. 1, 6, or 7, and/or aspects of one or more of the devices described with reference to FIG. 2, 3, 4, or 5. In some examples, a UE may execute one or more sets of codes to control the functional elements of the UE to perform the functions described below. Additionally or alternatively, the UE may perform one or more of the functions described below using special-purpose hardware.

At block 805, the method 800 may include the UE receiving a narrowband signal component of a synchronization signal for millimeter wave communications. The narrowband signal component may include correlation information. The correlation information may indicate a location of a wideband signal. The narrowband signal may also include or convey timing reference information for the millimeter wave communications. At block 810, the UE may use the correlation information to identify the wideband signal component of the synchronization signal for the millimeter wave communications. For instance, the UE may search the frequencies associated with the correlation information to detect and receive the wideband signal.

The operation(s) at blocks 805 and 810 may be performed using the synchronization module 210 and/or the synchronization signal reception module 510 described with reference to FIG. 2, 3, 4, or 5.

Thus, the method 800 may provide for wireless communication. It should be noted that the method 800 is just one implementation and that the operations of the method 800 may be rearranged or otherwise modified such that other implementations are possible.

Figure 9:
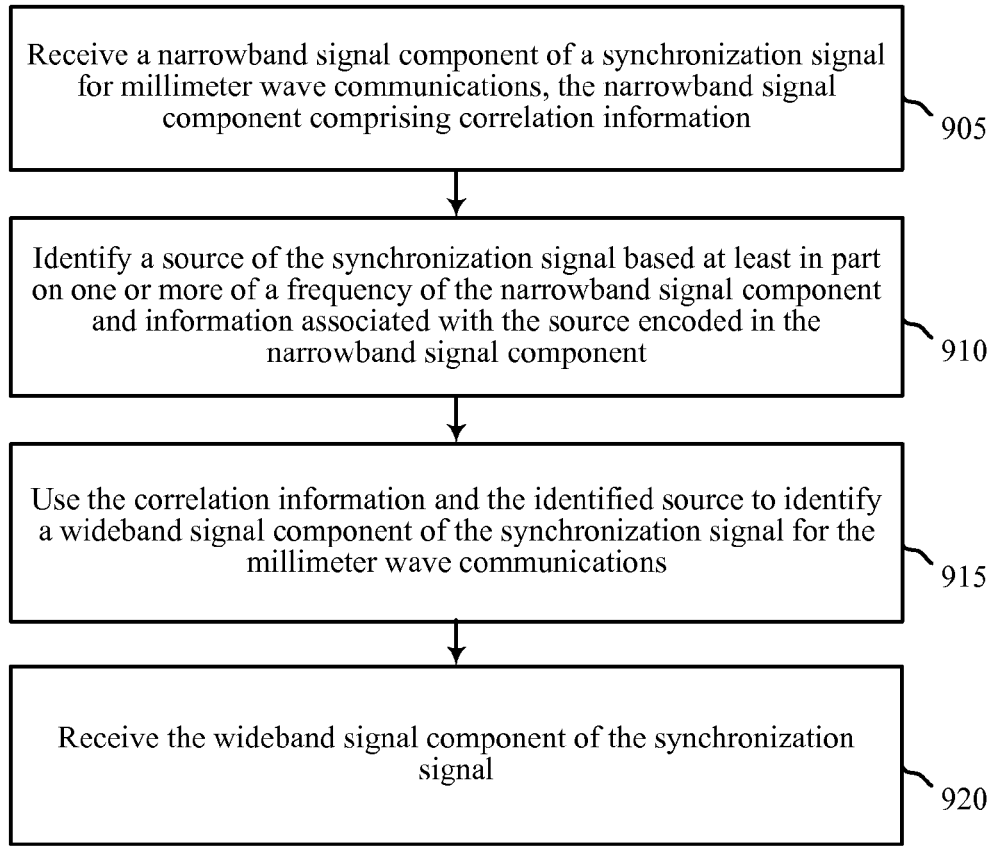
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of the UEs described with reference to FIG. 1, 6, or 7, and/or aspects of one or more of the devices described with reference to FIG. 2, 3, 4, or 5. In some examples, a UE may execute one or more sets of codes to control the functional elements of the UE to perform the functions described below. Additionally or alternatively, the UE may perform one or more of the functions described below using special-purpose hardware.

At block 905, the method 900 may include the UE receiving a narrowband signal component of a synchronization signal for millimeter wave communications. The narrowband signal component may include correlation information. The correlation information may indicate a location of a wideband signal. The narrowband signal may also include or convey timing reference information for the millimeter wave communications. At block 910, the UE may identify a source of the synchronization signal based at least in part on a frequency of the narrowband signal component and/or information associated with the source encoded in the narrowband signal component. In some examples, the frequency of the narrowband signal may convey the identification information for the source.

At block 915, the UE may use the correlation information and the identified source to identify the wideband signal component of the synchronization signal for the millimeter wave communications. For instance, the UE may use the frequency and/or identity information to determine which frequencies to search for the wideband signal component. Accordingly, at block 920 the UE may use the search the frequencies associated with the correlation information to detect and receive the wideband signal component of the synchronization signal.

The operation(s) at blocks 905, 910, 915, and 920 may be performed using the synchronization module 210 and/or the synchronization signal reception module 510 described with reference to FIG. 2, 3, 4, or 5.

Thus, the method 900 may provide for wireless communication. It should be noted that the method 900 is just one implementation and that the operations of the method 900 may be rearranged or otherwise modified such that other implementations are possible.

Figure 10:
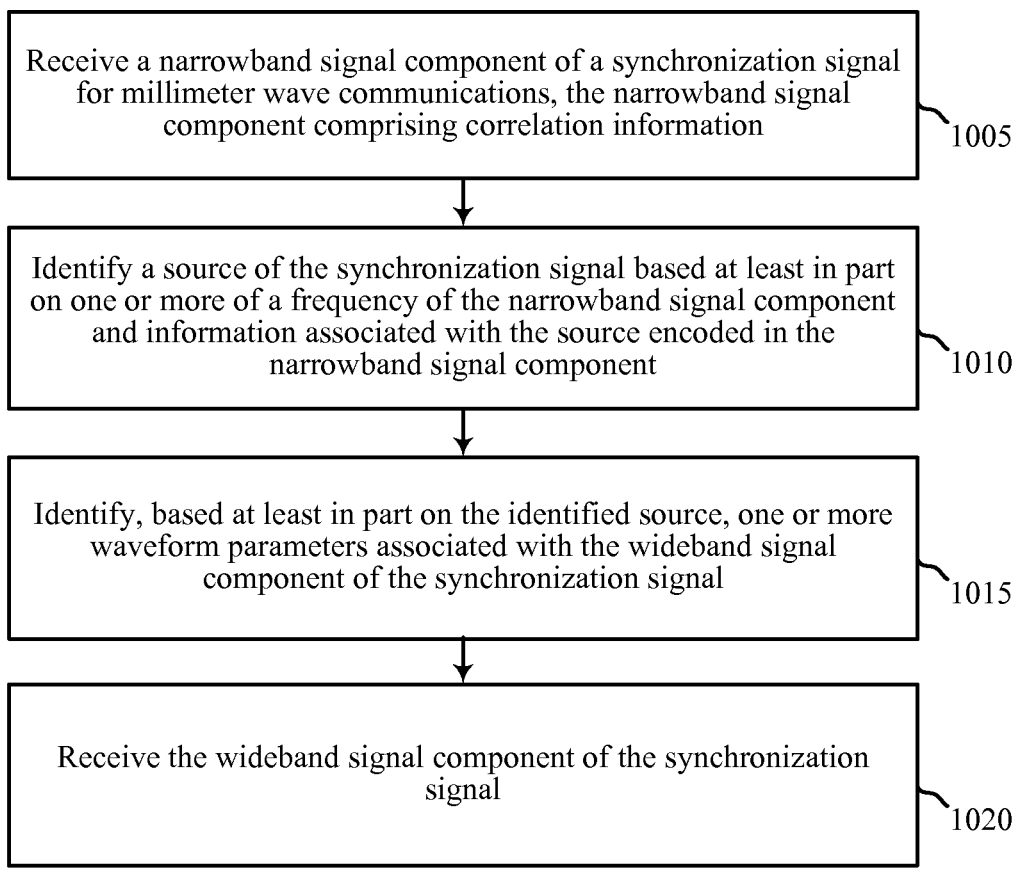
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the UEs described with reference to FIG. 1, 6, or 7, and/or aspects of one or more of the devices described with reference to FIG. 2, 3, 4, or 5. In some examples, a UE may execute one or more sets of codes to control the functional elements of the UE to perform the functions described below. Additionally or alternatively, the UE may perform one or more of the functions described below using special-purpose hardware.

At block 1005, the method 1000 may include the UE receiving a narrowband signal component of a synchronization signal for millimeter wave communications. The narrowband signal component may include correlation information. The correlation information may indicate a location of a wideband signal. The narrowband signal may also include or convey timing reference information for the millimeter wave communications. At block 1010, the UE may identify a source of the synchronization signal based at least in part on a frequency of the narrowband signal component and/or information associated with the source encoded in the narrowband signal component. In some examples, the frequency of the narrowband signal may convey the identification information for the source.

At block 1015, the UE may use the identified source to identify one or more waveform parameters associated with the wideband signal component of the synchronization signal for the millimeter wave communications. For instance, the UE may use the identity information to determine which frequencies to search for the wideband signal component. Accordingly, at block 1020 the UE may use the search the frequencies associated with the correlation information to detect and receive the wideband signal component of the synchronization signal.

The operation(s) at blocks 1005, 1010, 1015, and 1020 may be performed using the synchronization module 210 and/or the synchronization signal reception module 510 described with reference to FIG. 2, 3, 4, or 5.

Thus, the method 1000 may provide for wireless communication. It should be noted that the method 1000 is just one implementation and that the operations of the method 1000 may be rearranged or otherwise modified such that other implementations are possible.

In some examples, aspects from two or more of the methods 800, 900, and/or 1000 may be combined. It should be noted that the methods 800, 900, and 1000 are just example implementations, and that the operations of the methods 800-1000 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. method for wireless communications, comprising:
   receiving a narrowband signal component of a synchronization signal for millimeter wave communications, the narrowband signal component comprising correlation information that indicates location information associated with a wideband signal component of the synchronization signal;
   identifying a frequency and timing associated with the wideband signal component of the synchronization signal for the millimeter wave communications based at least in part on the correlation information received in the narrowband signal component;
   receiving the wideband signal component based at least in part on the identified frequency and timing; and
   synchronizing with a cell based at least in part on the narrowband signal component and the wideband signal component.

2. The method of claim 1, wherein the correlation information comprises encoded information relating to the wideband signal component of the synchronization signal for the millimeter wave communications.

3. The method of claim 1, wherein the narrowband signal component of the synchronization signal and the wideband signal component of the synchronization signal are received at a similar time.

4. The method of claim 1, further comprising:
   identifying a source of the synchronization signal based at least in part on one or more of a frequency of the narrowband signal component and information associated with the source encoded in the narrowband signal component.

5. The method of claim 4, further comprising:
   identifying, based at least in part on the identified source, one or more waveform parameters associated with the wideband signal component of the synchronization signal.

6. The method of claim 5, wherein the one or more waveform parameters comprise information associated with at least one of a pseudorandom noise sequence, a maximum length sequence, and at least one root of a Zadoff-Chu sequence.

7. The method of claim 6, wherein the at least one root of the Zadoff-Chu sequence is associated with a frame boundary.

8. The method of claim 5, wherein receiving the wideband signal component comprises:
   searching a frequency associated with the one or more identified one or more waveform parameters.

9. The method of claim 5, further comprising:
   identifying a timing reference based at least in part on the identified one or more waveform parameters associated with the wideband signal component.

10. The method of claim 1, further comprising:
    identifying a hopping pattern associated with the narrowband signal component of the synchronization signal.

11. The method of claim 10, wherein a periodicity of the hopping pattern is associated with a frame and the hopping pattern is reset at a boundary of the frame.

12. The method of claim 10, further comprising:
    identifying a timing reference based at least in part on the hopping pattern.

13. The method of claim 1, wherein a first timing reference conveyed in the narrowband signal component is associated with a system timing and a second timing reference conveyed in the wideband signal component is associated with a frame timing.

14. The method of claim 13, wherein the narrowband signal component comprises a beacon signal and the wideband signal component comprises a wideband signal.

15. The method of claim 14, wherein the wideband signal comprises information associated with at least one of a pseudorandom noise sequence, a maximum length sequence, and at least one root of a Zadoff-Chu sequence.

16. The method of claim 1, wherein the narrowband signal component and the wideband signal component of the synchronization signal are directionally transmitted via one or more beamformed signals.

17. An apparatus for wireless communications, comprising:
    a processor;
    memory in electronic communication with the processor; and
    instructions being stored in the memory, the instructions being executable by the processor to:
    receive a narrowband signal component of a synchronization signal for millimeter wave communications, the narrowband signal component comprising correlation information that indicates location information associated with a wideband signal component of the synchronization signal;

identify a frequency and timing associated with the wideband signal component of the synchronization signal for the millimeter wave communications based at least in part on the correlation information received in the narrowband signal component;

receive the wideband signal component based at least in part on the identified frequency and timing; and synchronize with a cell based at least in part on the narrowband signal component and the wideband signal component.

18. The apparatus of claim 17, further comprising instructions executable by the processor to:

identify a source of the synchronization signal based at least in part on one or more of a frequency of the narrowband signal component and information associated with the source encoded in the narrowband signal component.

19. The apparatus of claim 18, further comprising instructions executable by the processor to:

identify, based at least in part on the identified source, one or more waveform parameters associated with the wideband signal component of the synchronization signal.

20. The apparatus of claim 19, wherein the one or more waveform parameters comprise information associated with at least one of a pseudorandom noise sequence, a maximum length sequence, and at least one root of a Zadoff-Chu sequence.

21. The apparatus of claim 20, wherein the at least one root of the Zadoff-Chu sequence is associated with a frame boundary.

22. The apparatus of claim 19, wherein receiving the wideband signal component comprises instructions executable by the processor to:

search a frequency associated with the one or more identified one or more waveform parameters.

23. The apparatus of claim 19, further comprising instructions executable by the processor to:

identify a timing reference based at least in part on the identified one or more waveform parameters associated with the wideband signal component.

24. The apparatus of claim 17, further comprising instructions executable by the processor to:

identify a hopping pattern associated with the narrowband signal component of the synchronization signal.

25. The apparatus of claim 24, wherein a periodicity of the hopping pattern is associated with a frame and the hopping pattern is reset at a boundary of the frame.

26. An apparatus for wireless communications, comprising:

means for receiving a narrowband signal component of a synchronization signal for millimeter wave communications, the narrowband signal component comprising correlation information that indicates location information associated with a wideband signal component of the synchronization signal;

means for identifying a frequency and timing associated with the wideband signal component of the synchronization signal for the millimeter wave communications based at least in part on the correlation information received in the narrowband signal component;

means for receiving the wideband signal component based at least in part on the identified frequency and timing; and means for synchronizing with a cell based at least in part on the narrowband signal component and the wideband signal component.

27. The apparatus of claim 26, further comprising:

means for identifying a source of the synchronization signal based at least in part on one or more of a frequency of the narrowband signal component and information associated with the source encoded in the narrowband signal component.

28. The apparatus of claim 27, further comprising:

means for identifying, based at least in part on the identified source, one or more waveform parameters associated with the wideband signal component of the synchronization signal.

29. The apparatus of claim 28, wherein the means for receiving the wideband signal component comprises:

means for searching a frequency associated with the one or more identified one or more waveform parameters.

30. A non-transitory computer-readable medium storing computer executable code for wireless communication, the code executable by a processor to:

receive a narrowband signal component of a synchronization signal for millimeter wave communications, the narrowband signal component comprising correlation information that indicates location information associated with a wideband signal component of the synchronization signal;

identify a frequency and timing associated with the wideband signal component of the synchronization signal for the millimeter wave communications based at least in part on the correlation information received in the narrowband signal component;

receive the wideband signal component based at least in part on the identified frequency and timing; and synchronize with a cell based at least in part on the narrowband signal component and the wideband signal component.

* * * * *